S. CLENNIN.
THRESHING MACHINE.
APPLICATION FILED MAR. 11, 1908.

904,408.

Patented Nov. 17, 1908.

2 SHEETS—SHEET 1.

Witnesses
Frank Hough
K. Allen

Inventor
Samuel Clennin
By Victor J. Evans
Attorney

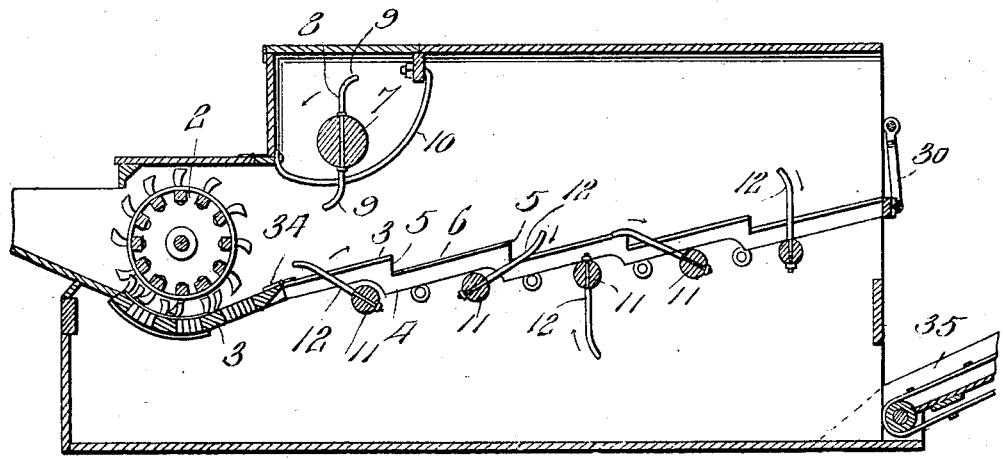
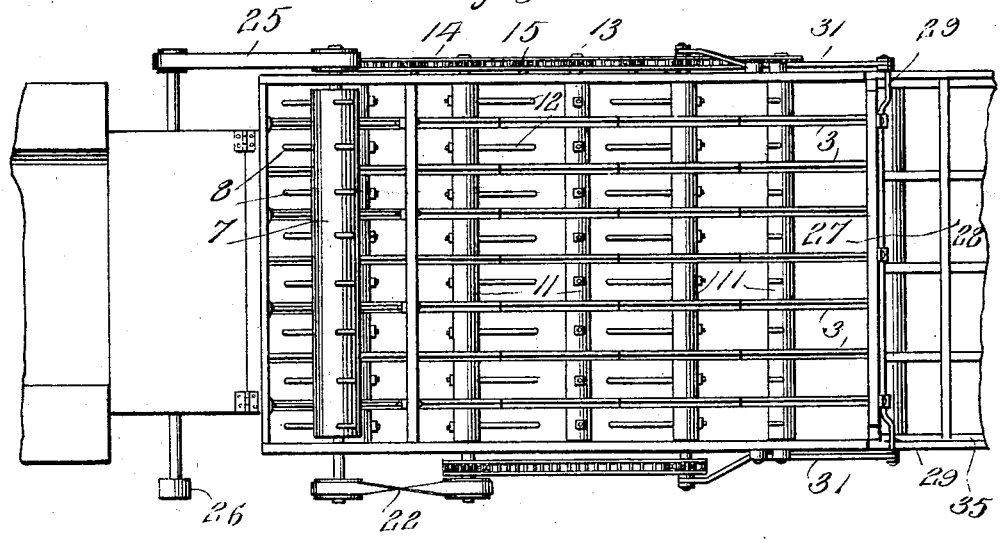

UNITED STATES PATENT OFFICE.

SAMUEL CLENNIN, OF BAWLF, ALBERTA, CANADA.

THRESHING-MACHINE.

No. 904,408.  Specification of Letters Patent.  Patented Nov. 17, 1908.

Application filed March 11, 1908. Serial No. 420,479.

*To all whom it may concern:*

Be it known that I, SAMUEL CLENNIN, a subject of the King of Great Britain, residing at Bawlf, in the Province of Alberta and Dominion of Canada, have invented new and useful Improvements in Threshing-Machines, of which the following is a specification.

The invention relates generally to an improvement in separators for threshing machines, and particularly to a separator in which the material is subjected to the vibratory movement imparted to the rack and forced longitudinally of said rack for the effective separating of the grain from the straw and other impurities.

The main object of the present invention is the provision of a rack adapted for movable connection at one end with the concave of the threshing cylinder and for independent movement at the opposite end to impart a reciprocatory movement to the rack, the construction including a series of beaters in the use of which the material is forced longitudinally of the racks.

The invention will be described in the following specification, reference being had particularly to the accompanying drawings, in which:—

Figure 1:
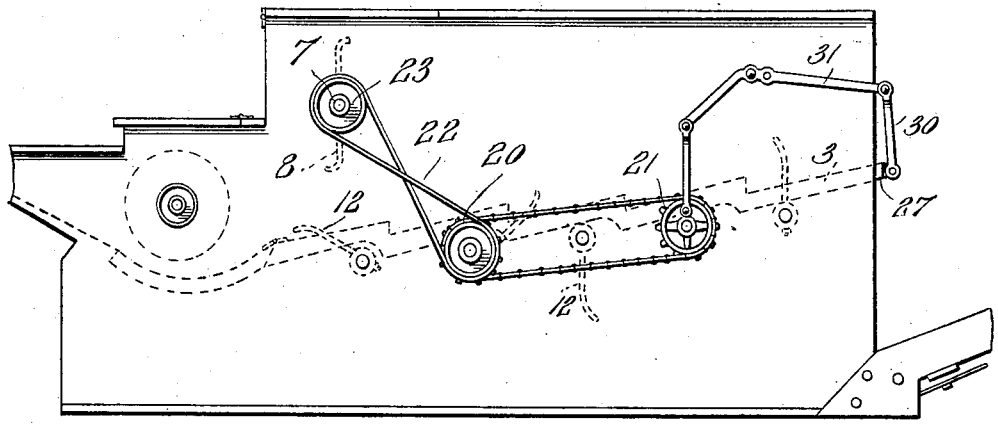
Figure 2:
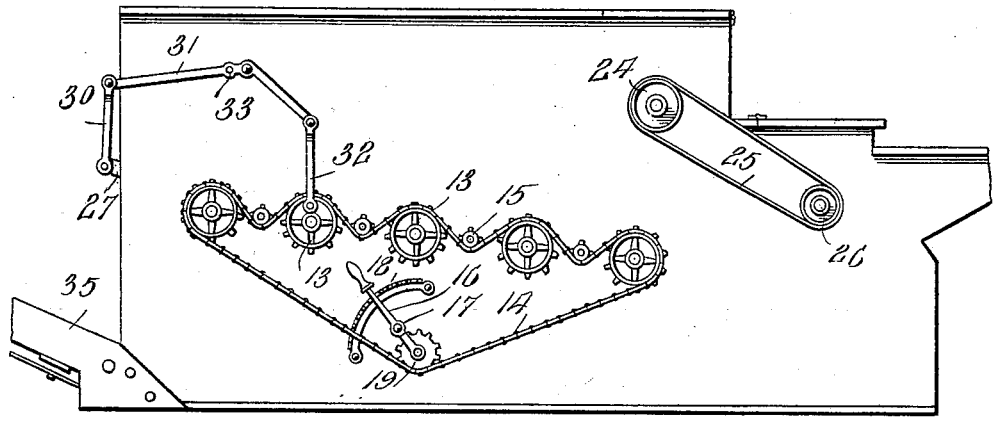

Figure 1 is a view in side elevation showing my improved separator. Fig. 2 is a similar view taken from the opposite side. Fig. 3 is a vertical longitudinal section through the same. Fig. 4 is a plan with the upper wall removed.

Referring particularly to the drawings, my improvement comprises a casing 1 in the relatively forward end of which is mounted a threshing cylinder 2 having a suitable coöperating concave 3, said cylinder and concave forming no material part of the present invention and illustrated to indicate any desired form of such parts. In advance of the concave is secured what I term the rack 3 comprising a series of longitudinally arranged bars 4, which are disposed in parallel spaced relation, as shown. The upper surfaces of each of these bars is formed with a shoulder 5 extending at right angles to the length of the bar and from the lower edge of which the surface of the bar inclines upwardly at 6 to the next shoulder in advance, thus forming a series of teeth, the upper surface of which is of materially greater length than the vertical surface and extends forwardly at an upward inclination toward the discharge end of the racks. Overlying the rack in advance of the threshing cylinder is arranged a double feed beater, comprising a transversely disposed shaft 7 mounted in side walls of the casing in which shaft is mounted the beaters proper preferably comprising metallic bars 8 passed diametrically through and secured in the shaft, the terminals of the bar projecting beyond the periphery of the shaft to form operating portions 9. A protective grating overlies the beaters comprising a series of curved bars 10 arranged in spaced relation, one of each of the beaters operating in the space between two adjacent bars, as will be clear from Fig. 4. The double beaters are so spaced with relation to the rack that they will in operation engage the material delivered from the cylinder and impart the initial movement to said material lengthwise the racks. Underlying the elongated surface of each tooth of the rack is a shaft 11, which shafts are disposed transversely of the casing and mounted in the side walls thereof. A series of individual forks or beaters 12 are secured to the shafts, preferably comprising metal bars which are passed diametrically through the shafts and secured in place therein by terminal nuts or the like. The respective beaters 12 operate between the rack bars 4, so that each adjacent pair of bars has an intermediate beater. The shafts are so normally disposed with relation to each other that the beaters thereof are arranged in opposition, that is the material being delivered by one beater will be immediately subsequent to said delivery picked up or engaged by the next succeeding beater, thus insuring a continuous feed of the material longitudinally of the racks.

The ends of the shafts 11 beyond one side wall of the casing are provided with sprocket wheels 13 to receive a chain 14, said chain intermediate the wheels 13 passing beneath sprocket idlers 15 arranged to insure proper coöperation of the chain with the wheels. A chain tightener is provided comprising a lever 16 pivotally supported at 17 on the casing and arranged for the usual adjustable locking engagement with the notch segment 18. The operative end of the lever is provided with a sprocket wheel 19 beneath which the chain 14 is adapted to pass. It is obvious that by proper movement of the lever the desired tension of the chain 14 may be readily secured. Two of the shafts 11 are also projected beyond the opposite side of the case and provided with sprocket wheels 20 and 21, the former including a grooved periphery for the reception of the cross belt 22 leading to a pulley wheel 23 on one end of the shaft 7 of the double beater, the opposite end of said shaft being provided with a second belt wheel 24 connected by a belt 25 with a belt wheel 26 mounted on the cylinder shaft. Power supplied to the cylinder is thus transmitted throughout the series of beater shafts, as will be obvious. The relatively free or forward ends of the rack bars 4 are connected by a transversely disposed cross bar 27 to which is connected a metallic bar 28 having the ends 29 spaced from and projected beyond the ends of the cross bar 27. The ends 29 of the metallic bar are connected by links 30 to angle levers 31 pivotally supported on each side of the casing 1, the rear ends of said levers 31 being connected by links 32 to sprocket wheels of the beater shafts, that is to the sprocket wheel 21 on one side of the casing and to the sprocket wheel 13 on the same shaft on the opposite side of the casing, the connections of the links 32 being, of course, eccentric to impart movement to the levers, and thereby to the racks in the operation of the shafts. The levers 31 are preferably formed with a plurality of pivot openings 33, whereby the pivotal supports of said lever may be adjusted to increase or decrease the movement of their free ends under the influence of the beater shafts.

As before stated the racks are movably connected to the concave of the threshing cylinder, and to this end I prefer that such connection be in the form of an ordinary hinge 34, as shown in Fig. 3. If desired the casing may be provided with an endless belt conveyer 35 arranged to receive the refuse from the racks and convey the same to any suitable place of deposit.

In operation material received from the threshing cylinder will be initially handled by the double beaters 9 and moved some distance lengthwise of the racks. By the use of the double beaters I effectively prevent clogging at this point, as the material is engaged by each of the beaters during the time that the shaft 7 is making one revolution. The material is, through the operation of the beaters 12 forced continuously and longitudinally of the racks, each beater serving to force the material beyond the shoulder 5 in advance thereof, as will be obvious. During the feed of the material longitudinally of the racks, the rack bars as an entirety are subjected to a vertical reciprocating movement at their free ends, thus vibrating the racks with the effect to separate the grain from the straw and other refuse.

The parts of the present improvement are of exceedingly simple construction, and may be readily connected to and coöperate with any threshing machine of ordinary type.

Having thus described the invention what is claimed as new, is:—

In a threshing machine the combination with a cylinder and concave, of a separating rack having hinge connection at one end with the concave, a series of beaters operating through the rack, a series of shafts on which the beaters are mounted, a series of sprocket wheels carried by said shafts, a chain for driving all of said sprocket wheels, means for adjusting the tension of the chain, and means connected to one of the sprocket wheels for agitating the free end of the rack.

In testimony whereof I affix my signature in presence of two witnesses.

SAMUEL CLENNIN.

Witnesses:
CHRISTIAN STERN,
CHRISTIAN F. BEHRENS.